United States Patent Office 3,378,450
Patented Apr. 16, 1968

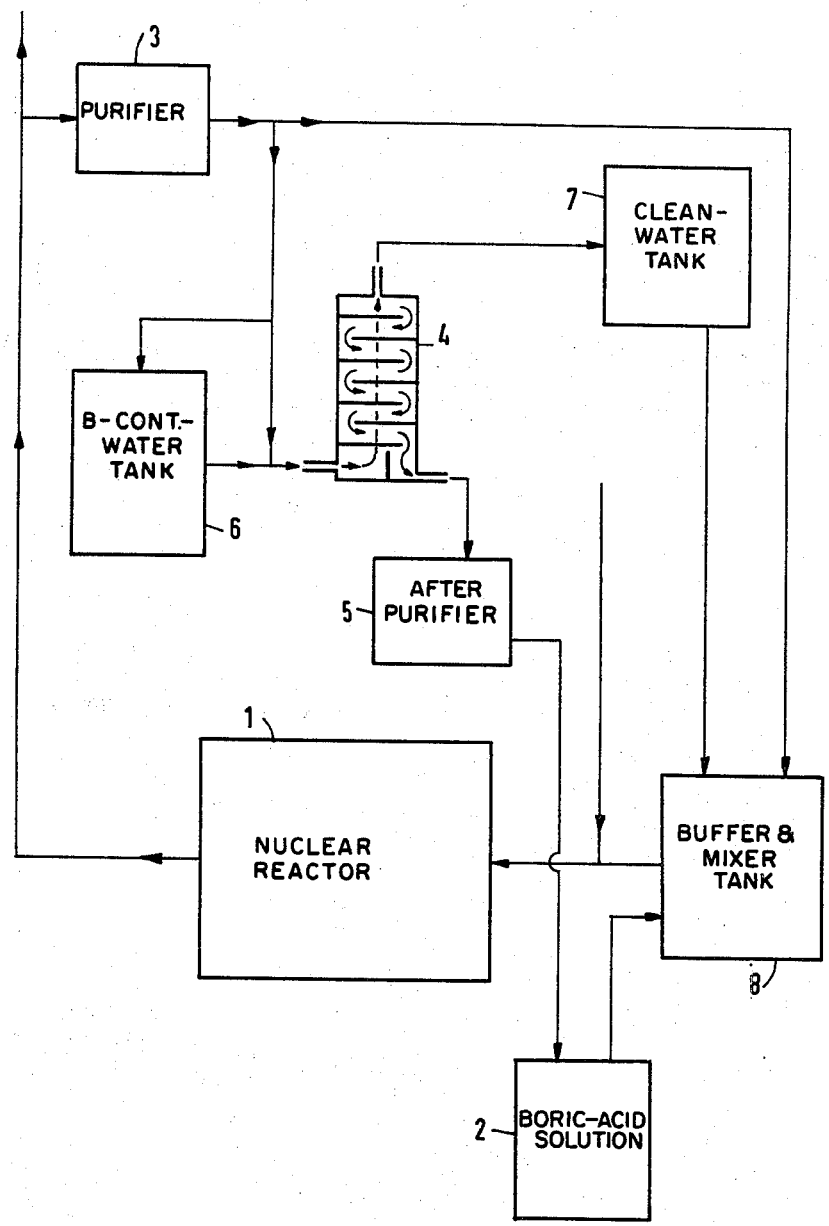

3,378,450
METHOD AND APPARATUS FOR RECOVERING BORIC ACID IN NUCLEAR REACTOR PLANTS CONTROLLED WITH BORIC ACID
Gottfried Grämer, Furth, and Ivan Kausz, Erlangen, Germany, assignors to Siemens Aktiengesellschaft, a corporation of Germany
Filed Jan. 11, 1967, Ser. No. 608,648
Claims priority, application Germany, Jan. 14, 1966, S 101,450
5 Claims. (Cl. 176—37)

ABSTRACT OF THE DISCLOSURE

Method of recovering boric acid in nuclear reactor plants controlled with boric acid by passing fluid medium mixed with boric acid, after it has traversed a reactor core and a purifier connected in parallel with the main flow loop of the reactor plant, through a rectification column adapted to separate a vapor-liquid mixture so as to concentrate the boric acid in liquid medium, passing the liquid medium concentrated with boric acid to an after-purifier for removing radioactive impurities therefrom, collecting the purified liquid medium concentrated with boric acid for recycling to the reactor, and also distilling vaporous medium separated in the rectification column and collecting the distillate substantially devoid of boric acid for recycling to the reactor.

Apparatus for carrying out the method comprising, in parallel connection with a main flow loop of a nuclear reactor, a purifier connected with a series arrangement of an intermediate tank for containing medium mixed with boric acid, a rectification column, an after-purifier, a supply tank for boric acid solution and a buffer and mixer tank, and parallel arrangement of a clear water supply tank connected between said rectification column and said buffer and mixer tank.

Specification

Our invention relates to method and apparatus for recovering boric acid in nuclear reactor plants controlled with boric acid.

Nuclear reactors are regulated, controlled and supervised by introducing neutron-absorbent materials into the reactor core proper. In their simplest form, these neutron absorbers can be employed in the shape of rods. The movement of these control rods is regulated in accordance with characteristic values of the reactor output, the neutron absorbent control rods being inserted into or withdrawn from the reactor core according to the power output desired. Due to the presence of such control rods, the distribution of neutron flux in the core of the reactor is, however, disadvantageously affected and distorted. This is associated with a non-uniform or erratic consumption of the fuel and therewith a reduction of the actual energy output.

The aforementioned disadvantage can be avoided by providing a uniform distribution of the neutron absorber throughout the entire core of the reactor. In individual cases there has already been a conversion from control rods to a system in which neutron absorbing material such as boric acid is dissolved in the coolant proper i.e. is distributed homogeneously, for various control situations. By suitably raising or lowering the neutron absorbent concentration, the same effects can accordingly be obtained as by moving the control rods. No technical difficulties are presented in increasing the concentration of the neutron absorbent since only a relatively small quantity of highly concentrated solution is sufficient for this purpose. The metering of this highly concentrated neutron absorbent solution can be made dependent upon the desired reactor power output.

A specific change in the concentration of the neutron absorbent solution in positive or negative direction corresponds to a specific change in the power output of the nuclear reactor. Since the concentration in the coolant proper is several orders of magnitude lower than in the solution prepared for increasing the concentration, to reduce the concentration in the coolant proper a considerably greater amount of the boron-containing water must be removed from the coolant than would be supplied thereto if the situation were reversed i.e. than if the concentration were to be increased. The same amount of water or coolant without neutron absorber is simultaneously supplied to the system. The coolant withdrawn in the case where the concentration is to be reduced, in most cases contains radioactive impurities which cannot be easily removed. The radioactivity carriers must first be removed from the withdrawn coolant water. This is effected in accordance with the methods employed heretofore by directly vaporizing the water at a concentration of for example over 2.5 grams boric acid per liter of water after neutralization with sodium hydroxide solution. For concentrations less than 2.5 grams boric acid per liter of water, the neutron absorber is removed by means of ion exchangers, the regenerated substance being then neutralized and vaporized. The concentrate formed thereby contains the radioactive substances in addition to the neutron absorbent and must either be stored in rust-free or stainless-steel containers for a very long time or must be put into solid condition by embedding it in bituminous material or cement and stored under supervision. In the last-mentioned case, the waste that has to be dealt with is also increased in volume. The storage of relatively large quantities of radioactive materials causes considerable difficulty and presents a heavy cost factor associated with an increased operating risk. Thus, for a reactor of about 300 megawatts electrical power output annually, about 12 tons boric acid which corresponds to 13 tons of neutralized solid substance, is produced. After the waste is embedded in bituminous material, a total amount of about 51 tons must be accounted for annually and suitably stored.

It is accordingly an object of our invention to provide method and apparatus for recovering boric acid in nuclear reactor plants controlled with boric acid which avoid the aforementioned disadvantages of the heretofore known methods and apparatus employed for that purpose.

With the foregoing and other objects in view, we accordingly provide a method which comprises passing a coolant or moderator liquid mixed with boric acid after it has gone through the reactor core and a purifying plant connected in parallel with the main flow loop, through a rectification column, such as a baffle plate column, suitable for separating a vapor—liquid mixture, in order to concentrate the boric acid in the coolant or moderator liquid, passing the liquid concentrated with boric acid into an after-purifying plant for removing radioactive impurities particularly therefrom and collecting the purified liquid in special containers for the purpose of resupplying it to the reactor in the same way as the distillate is collected and resupplied. For operating the rectification column, only a reverse flow of about 1% of the throughput is necessary, the concentration of the thus retrieved concentrated boric acid solution being adjusted at a desired value such as 12%, for example, and the distillate in a liter of water containing less than 0.01 mg. boric acid.

The method of our invention has the advantage that the recovered boric acid can be resupplied over and over for the purpose of controlling the reactor. Since each atom of boron $B_{10}$ transforms to the isotope $B_{11}$, however, with capture of a neutron, and since the isotope $B_{11}$ no longer has neutron absorbing properties, the previously present effective quantity of boric acid is gradually exhausted and the boric acid containing the isotope which remains is no longer available for the purpose of absorbing neutrons. When this occurs, the boron concentrate, by means of the apparatus provided for carrying out this method, is freed as usual in an after-purification plant from the main quantity of radioactive impurities still entrained therewith and can thereafter be treated as an inactive waste water.

Other features which are considered as characteristic for the invention are set forth in the appended claims.

Although the invention is illustrated and described herein as method and apparatus for recovering boric acid in nuclear reactor plants controlled with boric acid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description when read in connection with the accompanying single sheet of the drawing showing a block diagram of a plant for carrying out the method of our invention.

Referring now to the drawing, there is shown a nuclear reactor 1 from which the liquid coolant or moderator is conducted to a purifier 3. The purified coolant or moderator liquid such as water, for example, then passes from purifier 3 to the buffer and mixer tank 8 while the remainder passes to the rectification column 4. An intermediate tank for water containing boric acid is connected in parallel with the conduit interconnecting the purifier 3 and the rectification column 4. Clean water is separated in the rectification column 4 and passesd through a clean water tank 7 from which it is conducted to the buffer and mixer tank 8. Concentrated boric acid solution with some radioactive impurities is then passed from the rectification column 4 to an after-purifier 5 in which the radioactive impurities are removed and the purified boric acid solution is then passed to a supply tank 2 of 12% boric acid solution which is in turn also connected to the buffer and mixer tank 8, wherein the solution which is to be supplied to the nuclear reactor is mixed. The center of the entire apparatus is thus formed by the rectification column 4 whose structure is shown schematically in the figure.

As mentioned hereinabove, the boric acid had heretofore been neutralized before vaporizing the solution. The reason therefor was the water vapor volatility of the boric acid, which increases with increasing concentrations in the liquid water phase. If the solution were not neutralized, no separating action would then be provided for small quantities supplied to the vaporizer if the portion volatilizing with the water vapor produced exactly the same boric acid concentration in the distillate as is present in the quantity of solution supplied to the vaporizer. This volatilization of the boric acid from the solution which is to be vaporized is prevented in accordance with our invention by separating the dissolved substance from the water in a baffle plate column of conventional construction. The separation is effected by the fact that the rising water vapor is conducted on the individual baffle plates of the column through liquid water which is flowing or draining off. The liquid water draining off in the column is recovered or formed at the upper end, i.e. the head of the column, by partial condensation of the water vapor produced in the column vaporizer. By the stepwise rinsing or washing of the water vapor as it follows a tortuous path between the baffle plates, the final distillate can be reduced to a boron content less than 0.01 mg. per liter of water. All of the boric acid collects in the vaporizer, i.e. on the lower lever of the column, 4, and is again conducted therefrom ultimately to a supply container for further use. A special advantage of this method of our invention is that practically all of the vaporized water per unit of time can be recovered as a distillate because the reverse flow in the column is required to be only about 1% of the total throughput quantity of water.

As an example of the method and the apparatus for carrying out the method of our invention, a circuit for the coolant and/or moderator medium for recovering the added boric acid was provided as follows: The coolant and moderator water was originally present in the reactor 1. From the container 2, which contained a 12% solution of boric acid, the boric acid was metered by a non-illustrated but suitable regulating system to the buffer tank 8 which also serves as a mixing tank, until the water in the tank 8 attained the desired boric acid concentration. As this water containing boric acid was supplied to the nuclear reactor 1 for control purposes, a portion of the water previously contained in the nuclear reactor 1 was displaced. This displaced water, in addition to a partial flow of coolant medium which continually traverses the reactor, was then conducted to the purifier 3 and largely freed there of impurities. Since boric acid in this example was to be removed from the water, a corresponding quantity of water was drawn off downstream from the purifier 3 and conducted to an intermediate container 6 or directly to the distillation column 4. In the distillation or rectification column 4, the boric acid was separated from water and the purified or cleaned water was then delivered to the supply tank 7. The boric acid solution, on the other hand, passed from the base of the column 4 through an after-purifier 5 to the boric acid supply container 2. The reactor water containing boric acid which was supplied to the column 4 was increased, independently of its concentration when discharged from the reactor 1, to the concentration in the boric acid supply container 2 which in the instant example was about 12%. Due to the great concentration, however, the radioactive corrosion and fission products were also highly concentrated. The after-purifier 5 thus removed a good portion of these undesirable products from the solution which had not been previously removed by the circuit purifier 3 due to the fact that the solution in the purifier 3 was very weak.

By means of the foregoing method, consequently, the radioactivity in the reactor loop can be additionally reduced. The substantially 12% boric acid solution which reaches the supply container 2 from the after-purifier 5 can be employed further for controlling the reactor until it is depleted of boron $B_{10}$ or until the quantity of ineffective boron $B_{11}$ which is supplied becomes so great that the solution is no longer feasible for the reactor operation because of neutron-physical and corrosion considerations. When this point is reached, the boric acid solution concentrated in the column 4 is freed of radioactive impurities in the after-purifier 5, as aforedescribed, is withdrawn from the circuit and is thereafter able to be treated as an inactive waste water. In this manner, the radioactive waste or fallout originating directly from the main coolant loop is limited almost exclusively to the ion-exchanger resins accumulating from the purifier 3 and after the solution has passed through the after-purifier 5. These can be stored, however, in considerably smaller storage containers than those employed heretofore in the aforementioned previously known method.

As can be seen in the figure, the purification system of our invention is connected in parallel with the main flow loop 9, 10 of the reactor 1. Pumps and other auxiliary equipment of the main loop are not illustrated since they form no part of our invention.

Naturally, other circuit layouts can be employed for carrying out the method of our invention. Also, any other type of rectification column which is capable of separating a vapor-liquid mixture can be employed. These columns are of known construction so that even in the aforementioned example a more specific description thereof is not believed to be necessary. It should furthermore also be noted that this method of our invention is naturally not limited only for use with the aforementioned reactor installation. On the contrary, attention must also be directed to utilizing the method of our invention for the recovery of materials that take part in production processes, such as catalysts, for example.

We claim:

1. Method of recovering boric acid in nuclear reactor plants controlled with boric acid which comprises passing a fluid medium mixed with boric acid, after it has traversed a reactor core and a purifier connected in parallel with the main flow loop of the reactor plant, through a rectification column adapted to separate a vapor-liquid mixture so as to concentrate the boric acid in liquid medium, passing the liquid medium concentrated with boric acid to an after-purifier for removing radioactive impurities therefrom, and collecting the purified liquid medium concentrated with boric acid for recycling to the reactor.

2. Method according to claim 1 which includes distilling vaporous medium separated in the rectification column, and collecting the distillate substantially devoid of boric acid for recycling to the reactor.

3. Method according to claim 2 wherein flow of only up to about 1% of the fluid medium throughput is reversed in direction in the rectification column, the concentration of recovered boric acid solution is about 12%, and the distillate contains less than 0.01 mg. boric acid per liter of water.

4. Method according to claim 2 which includes freeing boric acid bereft of its neutron-absorbing property from the main quantity of radioactive impurities after it is concentrated in the after-purifier, and treating it thereafter as inactive water.

5. Apparatus for recovering boric acid in nuclear power plants controlled with boric acid comprising, in parallel connection with a main flow loop of a nuclear reactor, a purifier connected with a series arrangement of an intermediate tank for containing medium mixed with boric acid, a rectification column, an after-purifier, a supply tank for boric acid solution and a buffer and mixer tank, and a parallel arrangement of a clean water supply tank connected between said rectification column and said buffer and mixer tank.

References Cited

UNITED STATES PATENTS

| | | | |
|---|---|---|---|
| 2,967,809 | 1/1961 | Reed | 176—37 |
| 2,989,454 | 6/1961 | Breden et al. | 176—20 |
| 3,222,254 | 12/1965 | Maldaque et al. | 176—22 |

BENJAMIN R. PADGETT, *Primary Examiner.*

H. E. BEHREND, *Assistant Examiner.*